(12) United States Patent
Ribeiro De Matos

(10) Patent No.: US 7,533,486 B2
(45) Date of Patent: May 19, 2009

(54) FOLDABLE FISH-TRAP

(76) Inventor: Antonio Ventura Ribeiro De Matos, Guimbra, Anta, 4501-908 Espinho (PT)

( * ) Notice: Subject to any disclaimer, the term of this patent is extended or adjusted under 35 U.S.C. 154(b) by 0 days.

(21) Appl. No.: 11/709,751

(22) Filed: Feb. 23, 2007

(65) Prior Publication Data
US 2007/0251138 A1 Nov. 1, 2007

(30) Foreign Application Priority Data
Apr. 27, 2006 (PT) ................................ 103469

(51) Int. Cl.
*A01K 69/10* (2006.01)
*A01K 69/06* (2006.01)
(52) U.S. Cl. ............................. 43/105; 43/100; 43/102; 43/103
(58) Field of Classification Search ................... 43/100, 43/102–105, 65, 66
See application file for complete search history.

(56) References Cited

U.S. PATENT DOCUMENTS

| 514,388 | A | * | 2/1894 | Smith | 43/65 |
|---|---|---|---|---|---|
| 527,435 | A | * | 10/1894 | Loud, Jr. | 43/65 |
| 726,140 | A | * | 4/1903 | Campbell, Sr. | 43/65 |
| 777,382 | A | * | 12/1904 | Le Beau | 43/65 |
| 872,556 | A | * | 12/1907 | Carwile | 43/65 |
| 951,157 | A | * | 3/1910 | Todd | 43/65 |
| 1,079,576 | A | * | 11/1913 | Noyes | 43/100 |
| 1,139,501 | A | * | 5/1915 | Dennis | 43/65 |
| 1,237,399 | A | * | 8/1917 | Sloan | 43/65 |
| 1,485,875 | A | * | 3/1924 | O'Malley | 43/103 |
| 1,638,238 | A | * | 8/1927 | Brautigam et al. | 43/105 |
| 1,728,645 | A | * | 9/1929 | Ward et al. | 43/100 |
| 1,985,177 | A | * | 12/1934 | Lawrence | 43/100 |
| 2,413,552 | A | * | 12/1946 | Ethridge | 43/103 |
| 2,716,304 | A | * | 8/1955 | Taylor | 43/100 |
| 2,769,274 | A | * | 11/1956 | Ougland | 43/105 |
| 2,817,860 | A | * | 12/1957 | Fritz | 43/105 |
| 2,910,801 | A | * | 11/1959 | Safarik et al. | 43/105 |
| 2,935,811 | A | * | 5/1960 | Hurtig | 43/105 |
| 2,965,259 | A | * | 12/1960 | Johnson | 43/55 |
| 3,029,546 | A | * | 4/1962 | Ruiz | 43/105 |
| 3,045,386 | A | * | 7/1962 | Coyne | 43/100 |

(Continued)

FOREIGN PATENT DOCUMENTS

FR 2563080 A1 * 10/1985

(Continued)

*Primary Examiner*—Darren W Ark
(74) *Attorney, Agent, or Firm*—Pearl Cohen Zedek Latzer, LLP

(57) ABSTRACT

The present invention concerns a box-like fish-trap (1) comprising a frame, which is foldable, involved by a net, characterised in that it consists of:

A metallic upper body (2), which floats;
A metallic lower body (3);
Flexible cables (4) to fix the upper body (2) to the lower body (3);
Flexible side nets which connect the lower body (3) to the upper body (2);
Frames (6, 7) that hold the nets of the fish entrance openings (5) and which are arranged so as to let the fish come in but make it difficult for it to get out; and
One bottom (16) formed by a frame and net fixed in an articulated manner to one of the tops of the lower body and closed at the opposite top, which will make it possible to collect the captured fish.

10 Claims, 2 Drawing Sheets

U.S. PATENT DOCUMENTS

| | | | | | |
|---|---|---|---|---|---|
| 3,069,803 | A | * | 12/1962 | Leakey | 43/105 |
| 3,176,427 | A | * | 4/1965 | Hershey | 43/100 |
| 3,184,881 | A | * | 5/1965 | Jatzeck | 43/102 |
| 3,209,484 | A | * | 10/1965 | Beamer | 43/100 |
| 3,373,523 | A | * | 3/1968 | Olafson | 43/100 |
| 3,440,758 | A | * | 4/1969 | Prince | 43/100 |
| 3,497,989 | A | * | 3/1970 | Manno et al. | 43/100 |
| 3,678,612 | A | * | 7/1972 | Hendrickson | 43/105 |
| 3,699,702 | A | * | 10/1972 | Lankenau | 43/100 |
| 3,708,905 | A | * | 1/1973 | Jalbert | 43/100 |
| 3,786,593 | A | * | 1/1974 | Gerbrandt | 43/100 |
| 3,795,073 | A | * | 3/1974 | Olsen | 43/105 |
| 3,821,861 | A | * | 7/1974 | Jalbert | 43/100 |
| 3,841,016 | A | * | 10/1974 | Silva | 43/100 |
| 3,852,908 | A | * | 12/1974 | Christopher | 43/102 |
| 3,906,655 | A | * | 9/1975 | Lowenthal, Jr. | 43/105 |
| 3,951,104 | A | * | 4/1976 | Neff | 43/100 |
| 3,992,804 | A | * | 11/1976 | Senese | 43/100 |
| 4,030,232 | A | * | 6/1977 | Niva | 43/105 |
| 4,134,226 | A | * | 1/1979 | Petrella | 43/102 |
| 4,156,984 | A | * | 6/1979 | Kinser, Sr. | 43/105 |
| 4,221,071 | A | * | 9/1980 | Sjolund | 43/100 |
| 4,237,645 | A | * | 12/1980 | Kinser | 43/105 |
| 4,237,646 | A | * | 12/1980 | Mims, III | 43/105 |
| 4,244,323 | A | * | 1/1981 | Morimura | 43/102 |
| 4,251,943 | A | * | 2/1981 | Sawlsville | 43/55 |
| 4,354,325 | A | * | 10/1982 | Aho | 43/105 |
| 4,406,083 | A | * | 9/1983 | Hart | 43/105 |
| 4,409,752 | A | * | 10/1983 | Anderson | 43/105 |
| 4,411,092 | A | * | 10/1983 | Lalancette | 43/100 |
| 4,429,659 | A | * | 2/1984 | Holyoak | 43/103 |
| 4,445,295 | A | * | 5/1984 | Litrico | 43/105 |
| 4,452,005 | A | * | 6/1984 | Poirot | 43/100 |
| 4,604,823 | A | * | 8/1986 | Ponzo | 43/105 |
| 4,730,411 | A | * | 3/1988 | Katis | 43/105 |
| 4,821,451 | A | * | 4/1989 | Matson | 43/105 |
| 4,864,770 | A | * | 9/1989 | Serio | 43/105 |
| 4,986,021 | A | * | 1/1991 | Thomas | 43/104 |
| 5,197,224 | A | * | 3/1993 | Aulsebrook | 43/100 |
| 5,207,017 | A | * | 5/1993 | Litrico | 43/100 |
| 5,218,781 | A | * | 6/1993 | Miller | 43/105 |
| 5,259,809 | A | * | 11/1993 | Rainey, Jr. | 43/100 |
| 5,325,623 | A | * | 7/1994 | Sakuraoka et al. | 43/105 |
| 5,331,763 | A | * | 7/1994 | Miller | 43/105 |
| 5,351,435 | A | * | 10/1994 | Hill | 43/100 |
| 5,509,227 | A | * | 4/1996 | Marrero | 43/100 |
| 5,566,499 | A | * | 10/1996 | Washecka | 43/105 |
| 5,632,114 | A | * | 5/1997 | McKenzie | 43/105 |
| 5,839,220 | A | * | 11/1998 | Wass | 43/105 |
| 5,894,694 | A | * | 4/1999 | Erlandson | 43/100 |
| 5,924,237 | A | * | 7/1999 | Ives | 43/100 |
| 5,943,814 | A | * | 8/1999 | Bartlett, Jr. | 43/104 |
| 6,267,079 | B1 | * | 7/2001 | Eby | 43/100 |
| 6,550,180 | B1 | * | 4/2003 | Le | 43/105 |
| 6,786,000 | B1 | * | 9/2004 | Hong | 43/105 |
| 7,043,866 | B2 | * | 5/2006 | Burkovskiy | 43/100 |
| 7,313,887 | B2 | * | 1/2008 | Hibbs et al. | 43/105 |
| 2004/0181995 | A1 | * | 9/2004 | Cheramie | 43/105 |
| 2005/0198892 | A1 | * | 9/2005 | Lin | 43/100 |
| 2005/0229477 | A1 | * | 10/2005 | Gomez, Jr. | 43/100 |
| 2006/0112610 | A1 | * | 6/2006 | Philbrook | 43/105 |
| 2007/0261292 | A1 | * | 11/2007 | December | 43/100 |

FOREIGN PATENT DOCUMENTS

| | | | | |
|---|---|---|---|---|
| GB | 2150801 | A | * | 7/1985 |
| GB | 2154411 | A | * | 9/1985 |
| GB | 2209262 | A | * | 5/1989 |
| GB | 2241859 | A | * | 9/1991 |
| JP | 07008142 | A | * | 1/1995 |
| JP | 11225619 | A | * | 8/1999 |
| JP | 2006158267 | A | * | 6/2006 |
| JP | 2006197801 | A | * | 8/2006 |
| WO | WO 8707818 | A1 | * | 12/1987 |
| WO | WO 8904603 | A1 | * | 6/1989 |
| WO | WO 9812918 | A1 | * | 4/1998 |

* cited by examiner

FOLDABLE FISH-TRAP

SCOPE OF THE INVENTION

The present invention concerns fishing devices, more particularly fish-traps mainly intended to catch crustaceans.

PRIOR ART

Old traps, named "covos" (wicker fish pots of the bow-net type), basically presented the configuration of a pyramid and were made of interlaced osier. More recent traps employ a rigid or semi-rigid net and display other configurations. All these traps have a big disadvantage, which consists in the space they take during transport in the boats or while in storage.

This disadvantage was generically resolved with foldable traps, as in the case of patent U.S. Pat. No. 3,786,593. This patent refers to a trap having a frame with a box-like configuration, this frame being surrounded by a net. The said frame has a centre post and normally radially extending arms which are hinged to swing parallel to one another thereby folding the trap. A latching device is provided to hold the frame open or unfolded and resilient members apply tension to end walls of the trap which serve to keep the end walls taut and properly shaped to provide lead-ins to entrance openings formed therein.

However, the trap which is the objective of patent U.S. Pat. No. 3,786,593, although solving one of the problems of fish-traps, introduces some complexity in the construction thereof, which results in higher production costs.

These are the inconveniences that the trap which is the objective of this invention is intended to resolve. In fact, the trap designed is very easily built and applied and the production thereof has a very low cost.

SUMMARY OF THE INVENTION

The fundamental objective of the present invention is to design a foldable trap, thus allowing storage in a small space while on the boats or in the warehouse, but being simultaneously very easily built, because it makes use of very simple concepts. Basically, the trap of the present invention presents the characteristics set forth in claim 1.

BRIEF DESCRIPTION OF THE DRAWINGS

For ease of understanding of the following description, drawings are attached hereto, wherein.

DETAILED DESCRIPTION OF A PREFERRED EMBODIMENT

Figure 1:
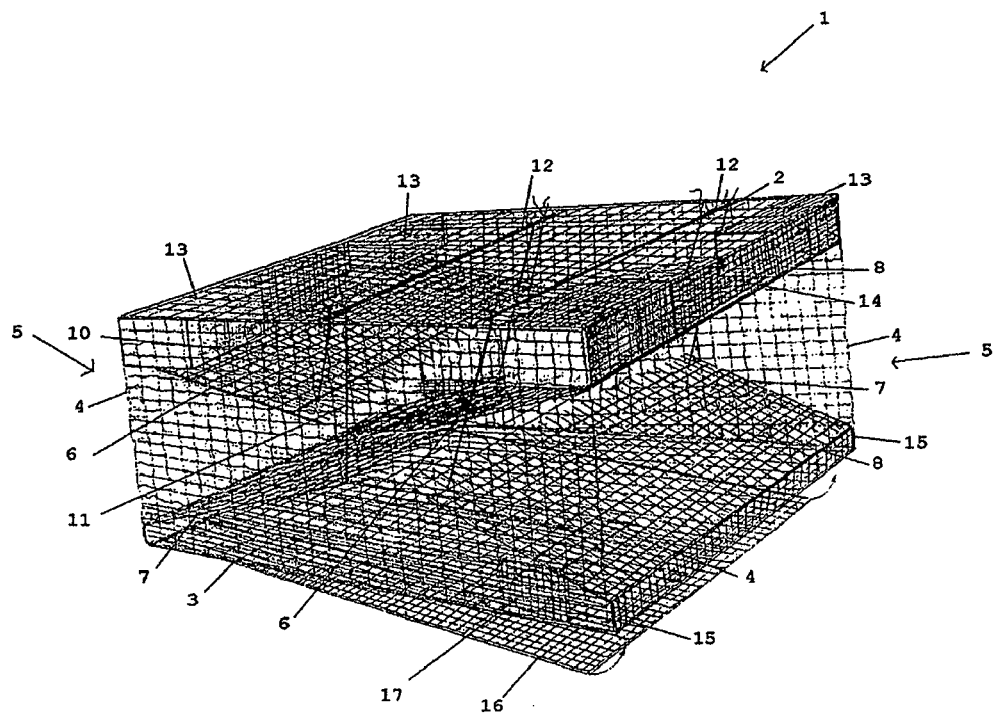
FIG. 1 depicts a perspective view of the objective of the invention in a built-up position.
Figure 2:
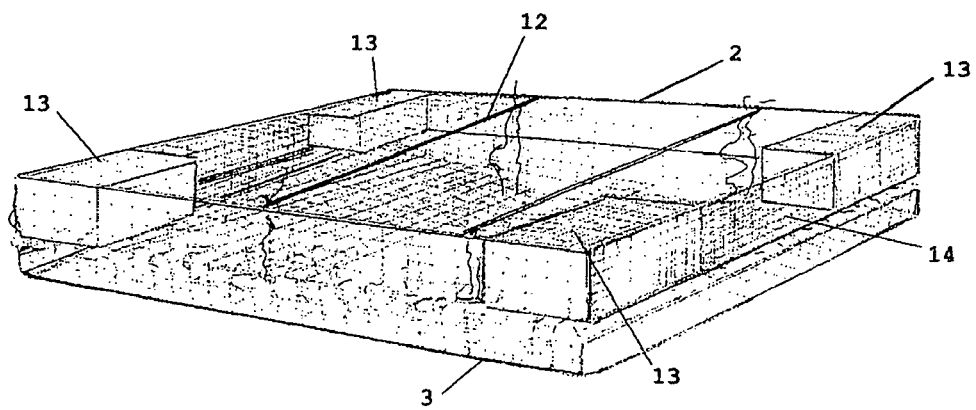
FIG. 2 also depicts a perspective view of the objective of the invention, but in a closed position.
Figure 3:
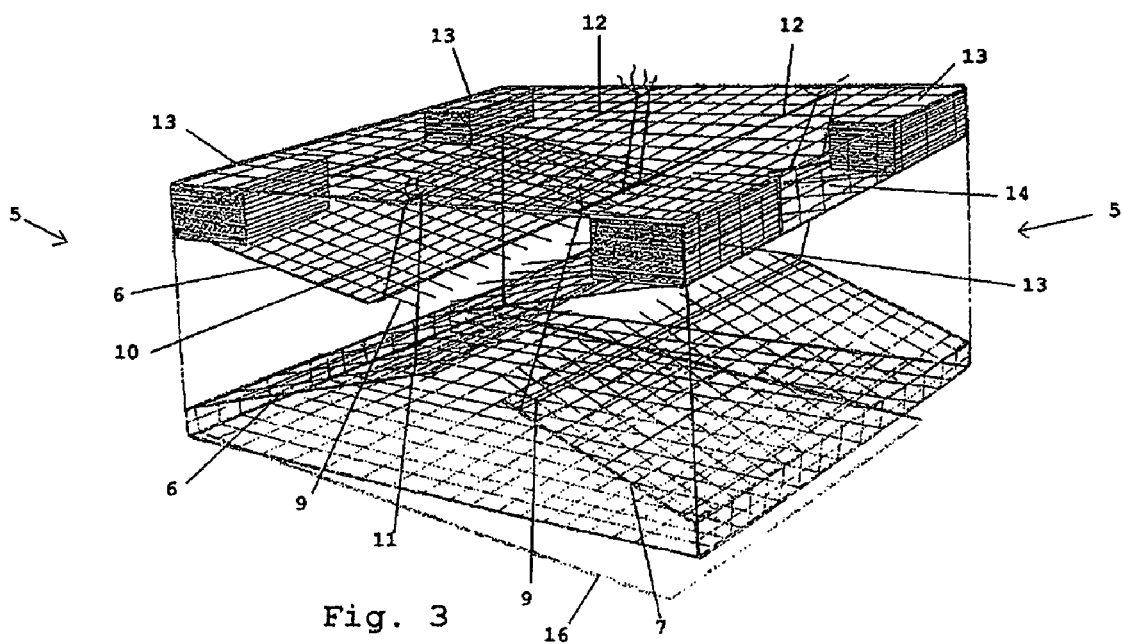
FIG. 3 further depicts a partial perspective view, part of the side nets having been removed.

As it may be observed in the figures, the trap generically depicted under reference 1 basically consists of an upper body 2 and a lower body 3, which are connected by cables 4 in order to form a rectangular parallelepiped. The fish entrance openings 5 are configured between the said bodies 2 and 3, one at each top chosen for the entrance and capture, e.g. the smallest faces of the parallelepiped. The entrance openings 5 are formed by the full openings of the selected faces, e.g. the top faces of with the smallest dimensions, and are circumscribed by frames 6 and 7 and the respective nets connected thereto, which are arranged in accordance with planes inclined in the outside-inside direction, and by the internal openings formed by the space between the inner tops of the said frames 6 and 7.

The said frames 6 and 7 of the entrance openings 5 are, on one of the sides 8, fixed in an articulated manner to one of the base tops of the upper body 2 and to the upper part of the lower body 3 and, on opposite sides 9, suspended by cables 10 and 11 fixed to a bar 12 provided for in the upper body 2.

The said cables 10 and 11 which suspend frames 6 and 7 from the entrance openings 5 may be regulated in height to tighten or loosen the internal opening of the entrance openings.

The nets of openings 5 may be trimmed with a plain or fringed mesh, the mesh size being defined in accordance with to the species to be fished and the law in force.

The upper body 2 is provided with buoys 13 near the corners of the faces having the smallest dimensions, which are responsible for the floating thereof. The said buoys 13, due to the buoyancy they provide, together with the weight of the remaining elements, ensure the unfolding of the trap into a built-up configuration as soon as it is placed in the water.

A safety opening 14 is mounted between the said buoys 13 of the tops of the said upper body, which is released whenever the trap is lost or abandoned, so that the fish may get out.

The safety opening 14 opens after a predetermined period of time. The opening is performed through decay of the fixing means thereof to the outer wall of opening 14, so that the captured fish may get out. Preferably, the fixing means, such as thin aluminium or iron wire or textile thread, will only have a given wear-out life while in the water, e.g. a given number of days, which ensures that the trap will open after that predetermined period of time, whenever it is considered as lost or abandoned.

The lower portion of the lower body 3 consists of a bottom 16 that is articulated on one side of the said metallic body and fixed in removable manner on the opposite side. In this way, it can be opened, so that the fish will be collected.

To make it possible to fish at different depths, the lower body 3 is provided with ballast 15 in its tops. These are containers placed like the buoys 13 and filled with ballast, the weight of which shall be in accordance with the desired depth.

The fish-trap is further equipped with an exit area 17 for fish of small dimension, thus complying with the laws on this matter, such area being provided with an opening that may be adjusted.

The invention claimed is:

1. A fish trap having the form of a box, the fish trap comprising a frame with a net and which is foldable, comprising:
   a metallic upper body which floats;
   a metallic lower body;
   flexible cables to fix the upper body to the lower body;
   flexible side nets which connect the lower body to the upper body;
   frames which hold nets of two fish entrance openings, each of said frames having one edge forming an articulated joint with one of said upper and lower bodies and an opposite edge to said one edge suspended from said upper body by at least one cable, wherein said frames are arranged so as to let the fish come in; and
   a bottom formed by a frame and net fixed in an articulated manner to the lower body allowing the collection of captured fish.

2. The fish trap according to claim 1, wherein said entrance openings are circumscribed by the frames and the respective nets held thereto, which are arranged in accordance with planes of the frames which are inclined in an outside-inside direction, and by a set of internal openings formed by a space between inner tops of the frames.

3. The fish trap according to claim 2, wherein said cables for suspending the opposite edges of said frames are fixed to a bar provided for in the upper body.

4. The fish trap according to claim 3, wherein said cables which suspend the opposite edges of said frames may be regulated in height to tighten or loosen the internal openings of the entrance openings.

5. The fish trap according to claim 1, wherein the upper body comprises buoys at tops thereof which, due to the buoyancy the buoys provide, together with a weight of the remaining elements of the fish trap, ensure the unfolding of the trap into a built-up configuration as soon as it is placed in the water.

6. The fish trap according to claim 5, wherein a safety opening is provided between the buoys of the tops of said upper body, which is released so that the fish may get out whenever the trap is considered as lost or abandoned.

7. The fish trap according to claim 6, wherein the safety opening opens after a predetermined period of time, through decay of fixing means thereof, so that the captured fish may get out.

8. The fish trap according to claim 1, wherein the lower body is provided with ballast in tops thereof.

9. The fish trap according to claim 1, wherein the nets of the openings may be trimmed with a plain or fringed mesh, a mesh size thereof being defined in accordance both to the species to be fished and with the law in force.

10. The fish trap according to claim 1, wherein the trap is further equipped with an exit area for fish of small dimension.

* * * * *